US006819863B2

(12) United States Patent
Dagtas et al.

(10) Patent No.: US 6,819,863 B2
(45) Date of Patent: Nov. 16, 2004

(54) SYSTEM AND METHOD FOR LOCATING PROGRAM BOUNDARIES AND COMMERCIAL BOUNDARIES USING AUDIO CATEGORIES

(75) Inventors: Serhan Dagtas, Croton-on-Hudson, NY (US); Nevenka Dimitrova, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 619 days.

(21) Appl. No.: 09/746,077

(22) Filed: Dec. 22, 2000

(65) Prior Publication Data

US 2002/0080286 A1 Jun. 27, 2002
US 2004/0201784 A9 Jun. 27, 2002

Related U.S. Application Data

(63) Continuation-in-part of application No. 09/006,657, filed on Jan. 13, 1998, now Pat. No. 6,363,380.

(51) Int. Cl.[7] .............................................. H04N 5/91
(52) U.S. Cl. ....................................... 386/46; 358/908
(58) Field of Search ............................ 386/46, 95, 94; 358/908

(56) References Cited

U.S. PATENT DOCUMENTS

| 5,343,251 A | * | 8/1994 | Nafeh ........................ 348/571 |
| 5,999,688 A | * | 12/1999 | Iggulden et al. ............... 386/46 |
| 6,363,380 B1 | * | 3/2002 | Dimitrova ....................... 707/6 |
| 6,434,520 B1 | * | 8/2002 | Kanevsky et al. .......... 704/243 |
| 6,459,735 B1 | * | 10/2002 | Suito ...................... 375/240.15 |
| 2002/0164151 A1 | * | 11/2002 | Jasinschi et al. .............. 386/69 |

FOREIGN PATENT DOCUMENTS

| DE | 19737889 | 3/1998 | ........... G11B/27/10 |
| DE | 19737889 A | 3/1998 | ........... G11B/27/10 |
| EP | O856991a2 | 8/1998 | .......... H04N/5/782 |
| JP | 10174039 A | 6/1998 | ......... H04N/5/7826 |
| WO | WO0128240 | 4/2001 | ............ H04N/7/00 |

OTHER PUBLICATIONS

Saraceno C et. al. "Indexing Audiovisual Databases Through Joint Audio and Video Processing" International Journal of Imaging Systems and Technology, Wiley and Sons, New York, US. 1998 XP000782119.

* cited by examiner

Primary Examiner—Thai Tran
Assistant Examiner—Alicia M Duggins
(74) Attorney, Agent, or Firm—Edward W. Goodman

(57) ABSTRACT

For use in a video signal processor, there is disclosed a system and method for locating program boundaries and commercial boundaries using audio categories. The system comprises an audio classifier controller that obtains information concerning the audio categories of the segments of an audio signal. Audio categories include such categories as silence, music, noise and speech. The audio classifier controller determines the rates of change of the audio categories. The audio classifier controller then compares each rate of change of the audio categories with a threshold value to locate the boundaries of the programs and commercials. The audio classifier controller is also capable of classifying at least one feature of an audio category change rate using a multifeature classifier to locate the boundaries of the programs and commercials.

14 Claims, 4 Drawing Sheets

SYSTEM AND METHOD FOR LOCATING PROGRAM BOUNDARIES AND COMMERCIAL BOUNDARIES USING AUDIO CATEGORIES

CROSS-REFERENCE TO RELATED APPLICATION AND PATENT

This is a continuation-in-part application of U. S. patent application Ser. No. 09/006,657 filed Jan. 13, 1998, entitled "MULTIMEDIA COMPUTER SYSTEM WITH STORY SEGMENTATION CAPABILITY AND OPERATING PROGRAM THEREFOR INCLUDING FINITE AUTOMATON VIDEO PARSER", now U.S. Pat. No. 6,363,380.

The present invention is also related to the invention disclosed in U.S. Pat. No. 6,100,941, issued Aug. 8, 2000, entitled "APPARATUS AND METHOD FOR LOCATING A COMMERCIAL DISPOSED WITHIN A VIDEO DATA STREAM." This patent and this patent application are commonly assigned to the assignee of the present invention. The disclosures of this patent and patent application are hereby incorporated herein by reference for all purposes as if fully set forth herein.

TECHNICAL FIELD OF THE INVENTION

The present invention is directed, in general, to a system and method for locating the boundaries of segments of a video program within a video data stream and, more specifically, to a system and method for locating boundaries of video programs and boundaries of commercial messages by using audio categories such as speech, music, silence, and noise.

BACKGROUND OF THE INVENTION

A wide variety of video recorders are available in the marketplace. Most people own, or are familiar with, a video cassette recorder (VCR), also referred to as a video tape recorder (VTR). A video cassette recorder records video programs on magnetic cassette tapes. More recently, video recorders that use computer magnetic hard disks rather than magnetic cassette tapes to store video programs have appeared in the market. For example, the ReplayTV™ recorder and the TiVO™ recorder digitally record television programs on hard disk drives using, for example, an MPEG video compression standard. Additionally, some video recorders may record on a readable/writable, digital versatile disk (DVD) rather than a magnetic disk.

Video recorders are typically used in conjunction with a video display device such as a television. A video recorder may be used to record a video program at the same time that the video program is being displayed on the video display device. A common example is the use of a video cassette recorder (VCR) to record television programs while the television programs are simultaneously displayed on a television screen.

Video recorders rely on high level Electronics Program Guide (EPG) information in order to determine the start times and the end times of television programs for recording purposes. Unfortunately, the EPG information may often be inaccurate, especially for live television broadcasts. There is a need in the art for an improved system and method for locating the boundaries of video programs. However, broadcasters are not motivated to insert any metadata information about the boundaries of commercial messages ("commercials") in video programs.

Various methods exist to detect the start times and the end times of segments of video programs. These methods are typically used to detect commercials so that the commercials may be automatically skipped over when a video program is being recorded in a video recorder. Several well known methods involve the detection of a "black frame." A black frame is a black video frame that is usually found immediately before and after a commercial. Other methods for detecting the boundaries of a commercial include using cut rate change, super histograms, digitized codes with time information, etc.

Another prior art method for detecting the boundaries of a program or a commercial involves inserting a special code or signal in the video signal to designate the beginning and the end of the program or commercial. Special circuitry is needed to detect and identify the special code or signal.

In addition, there are presently existing television standards that insert program identification information in the video signal. The program identification information uniquely identifies the beginning and the end of the program. This information can also be used to detect the boundaries of programs.

These prior art methods all involve the insertion and detection of special codes, special signals, or special program identification information within a video data stream. There is a need in the art for an improved system and method for locating the boundaries of video programs and commercials within a video data stream without using special codes, special signals, or special program identification information.

There is also a need for an improved system and method for automatically locating the boundaries of video programs and the boundaries of commercials in computerized personal multimedia retrieval systems. Computerized personal multimedia retrieval systems exist for identifying and recording segments of a video program (usually from a television broadcast) that contain topics that a user desires to record. The desired segments are usually identified based upon keywords input by the user. In a typical application, a computer system operates in the background to monitor the content of information from a source such as the Internet. The content selection is guided by the keywords provided by the user. When a match is found between the keywords and the content of the monitored information, the information is stored for later replay and viewing by the user. The downloaded information may include links to audio signals and to video clips that can also be downloaded by the user.

A computerized personal multimedia retrieval system that allows users to select and retrieve portions of television programs for later playback usually meets three primary requirements. First, a system and method is usually available for parsing an incoming video signal into its visual, audio, and textual components. Second, a system and method is usually available for analyzing the content of the audio and/or textual components of the broadcast signal with respect to user input criteria and segmenting the components based upon content. Third, a system and method is usually available for integrating and storing program segments that match the user's requirements for later replay by the user. Fourth, users prefer to record/playback only program segments and not commercials.

A system that meets these requirements is described in U.S. patent application Ser. No. 09/006,657 filed Jan. 13, 1998 by Dimitrova (a co-inventor of the present invention) entitled "MULTIMEDIA COMPUTER SYSTEM WITH STORY SEGMENTATION CAPABILITY AND OPERAT- ING PROGRAM THEREFOR INCLUDING FINITE AUTOMATON VIDEO PARSER." U.S. patent application Ser. No. 09/006,657 is hereby incorporated herein by reference within this document for all purposes as if fully set forth herein.

U.S. patent application Ser. No. 09/006,657 describes a system and method that provides a set of models for recognizing a sequence of symbols, a matching model that identifies desired selection criteria, and a methodology for selecting and retrieving one or more video story segments or sequences based upon the selection criteria.

A significant improvement in the operation of video signal processors, such as video recorders and computerized personal multimedia retrieval systems, can be obtained if the locations of the boundaries of the video programs and commercials are known. There is therefore a need in the art for an improved system and method for locating the boundaries of video programs and the boundaries of commercials within a video data stream.

SUMMARY OF THE INVENTION

To address the above-discussed deficiencies of the prior art, it is a primary object of the present invention to provide an improved system and method for locating the boundaries of video programs and the boundaries of commercials within a video data stream by using the audio content of the program. Specifically, is it is a primary object of the present invention to provide an improved system and method for locating the boundaries of video programs and the boundaries of commercials within a video data stream by using audio categories such as speech, music, silence, and noise.

It is also a primary object of the present invention to provide an improved system and method for automatically locating the boundaries of video programs and the boundaries of commercials within a video data stream without requiring the use of special codes, special signals, or special program identification information inserted in the video data stream.

The system of the present invention comprises an audio classifier controller that categorizes sequential portions of audio signals into audio categories such as speech, music, silence, and noise. The audio classifier controller also categorizes sequential portions of audio signals into audio categories such as speech with background music, speech with background noise, speech with background speech, etc. The audio classifier controller identifies also categorizes sequential portions of audio speech signals in speaker categories when the identity of a speaker can be determined. Each speaker category contains audio speech signals of one individual speaker. Speakers who can not be identified are categorized in an "unknown speaker" category.

The audio classifier controller of the present invention also comprises a category change detector that detects when a first portion of the audio signal categorized in a first category ceases and when a second portion of the audio signal categorized in a second category begins. That is, the category change detector determines when a category of the audio signal changes. In this manner the audio classifier controller of the present invention continually determines the type of each audio category.

The category change detector also determines when a first portion of the audio signal categorized in a first speaker category ceases and when a second portion of the audio signal categorized in a second speaker category begins. That is, the category change detector determines when a speaker category of the audio signal changes.

The audio classifier controller of the present invention also comprises a category change rate detector that determines the rate at which the audio categories are changing (the "category change rate"). The category change rate detector compares the category change rate to a threshold value. The threshold value can either be a preselected value or can be determined dynamically in response to changing operating conditions. If the category change rate is greater than the threshold value, the existence of a commercial segment may be inferred, therefore leading to the existence of a boundary.

It is an object of the present invention to provide an improved system and method for identifying boundaries using classification of audio signals to obtain at least one audio category for each segment of an audio signal.

It is also an object of the present invention to provide an improved system and method for identifying boundaries using classification of audio signals into audio categories such as silence, music, noise and speech.

It is also an object of the present invention to provide an improved system and method for identifying boundaries using classification of audio signals into audio subcategories such as speech with background music, speech with background noise, music with background noise, etc.

It is another object of the present invention to provide an improved system and method for identifying boundaries by accessing a speech database to classify speech audio signals of persons who are speaking during a speech segment of an audio signal.

It is an additional object of the present invention to provide an improved system and method for identifying boundaries by determining when an audio category changes.

It is an additional object of the present invention to provide an improved system and method for identifying boundaries by determining when a speaker changes.

It is also an object of the present invention to provide an improved system and method for determining the rates at which audio categories change in an audio signal.

It is another object of the present invention to compare the rate at which an audio category changes in an audio signal with a threshold value to locate boundaries of video program segments and commercials in a video program segment that contains the audio signal.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged audio classification system.

Figure 1:
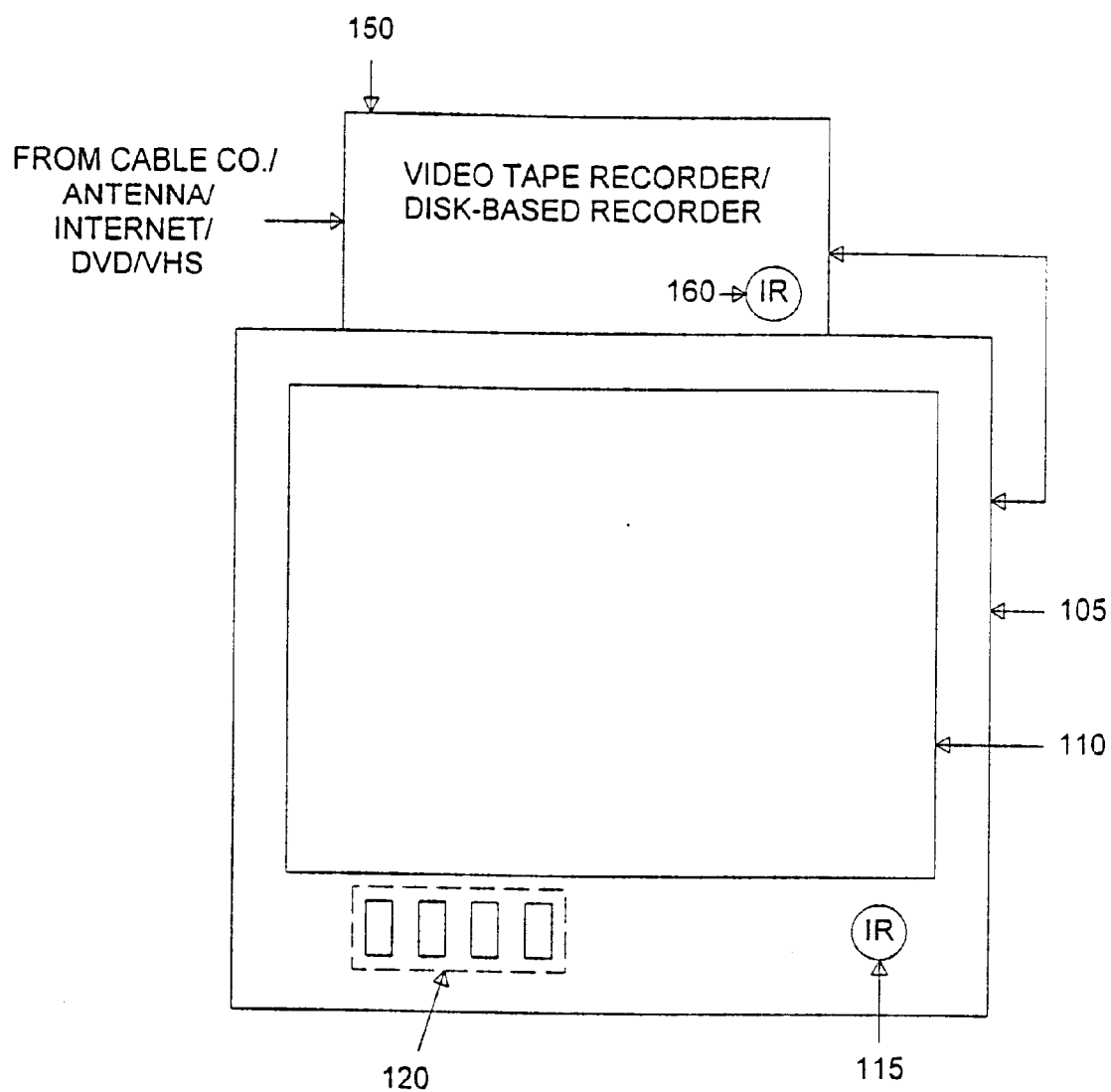
FIG. 1 illustrates an exemplary video recorder and a television set, according to an advantageous embodiment of the present invention.

FIG. 1 illustrates exemplary video recorder 150 and television set 105 according to one embodiment of the present invention. Video recorder 150 receives incoming television signals from an external source, such as a cable television service provider (Cable Co.), a local antenna, a satellite, the Internet, or a digital versatile disk (DVD) or a Video Home System (VHS) tape player. Video recorder 150 transmits television signals from a selected channel to television set 105. A channel may be selected manually by the viewer or may be selected automatically by a recording device previously programmed by the viewer. Alternatively, a channel and a video program may be selected automatically by a recording device based upon information from a program profile in the viewer's personal viewing history.

In Record mode, video recorder 150 may demodulate an incoming radio frequency (RF) television signal to produce a baseband video signal that is recorded and stored in a storage medium within or connected to video recorder 150. In Play mode, video recorder 150 reads a stored baseband video signal (i.e., a program) selected by the viewer from the storage medium and transmits it to television set 105.

Video recorder 150 may comprise a video recorder of the type that utilizes recording tape, or that utilizes a hard disk, or that utilize solid state memory, or that utilizes any other type of recording apparatus. If video recorder 150 is a video cassette recorder (VCR), video recorder 150 stores and retrieves the incoming television signals to and from a magnetic cassette tape. If video recorder 150 is a disk drive-based device, such as a ReplayTV™ recorder or a TiVO™ recorder, video recorder 150 stores and retrieves the incoming television signals to and from a computer magnetic hard disk rather than a magnetic cassette tape. In still other embodiments, video recorder 150 may store and retrieve from a local read/write (R/W) digital versatile disk (DVD) or a read/write (R/W) compact disk (CD-RW). The local storage medium may be fixed (e.g., hard disk drive) or may be removable (e.g., DVD, CD-RW).

Video recorder 150 comprises infrared (IR) sensor 160 that receives commands (such as Channel Up, Channel Down, Volume Up, Volume Down, Record, Play, Fast Forward (FF), Reverse, and the like) from remote control device 125 operated by the viewer. Television set 105 is a conventional television comprising screen 110, infrared (IR) sensor 115, and one or more manual controls 120 (indicated by a dotted line). IR sensor 115 also receives commands (such as Volume Up, Volume Down, Power On, Power Off) from remote control device 125 operated by the viewer.

It should be noted that video recorder 150 is not limited to receiving a particular type of incoming television signal from a particular type of source. As noted above, the external source may be a cable service provider, a conventional RF broadcast antenna, a satellite dish, an Internet connection, or another local storage device, such as a DVD player or a VHS tape player. The incoming signal may be a digital signal, an analog signal, Internet protocol (IP) packets, or signals in other types of format.

For the purposes of simplicity and clarity in explaining the principles of the present invention, the descriptions that follow shall generally be directed to an embodiment in which video recorder 150 receives (from a cable service provider) incoming analog television signals. Nonetheless, those skilled in the art will understand that the principles of the present invention may readily be adapted for use with digital television signals, wireless broadcast television signals, local storage systems, an incoming stream of IP packets containing MPEG data, and the like.

Figure 2:
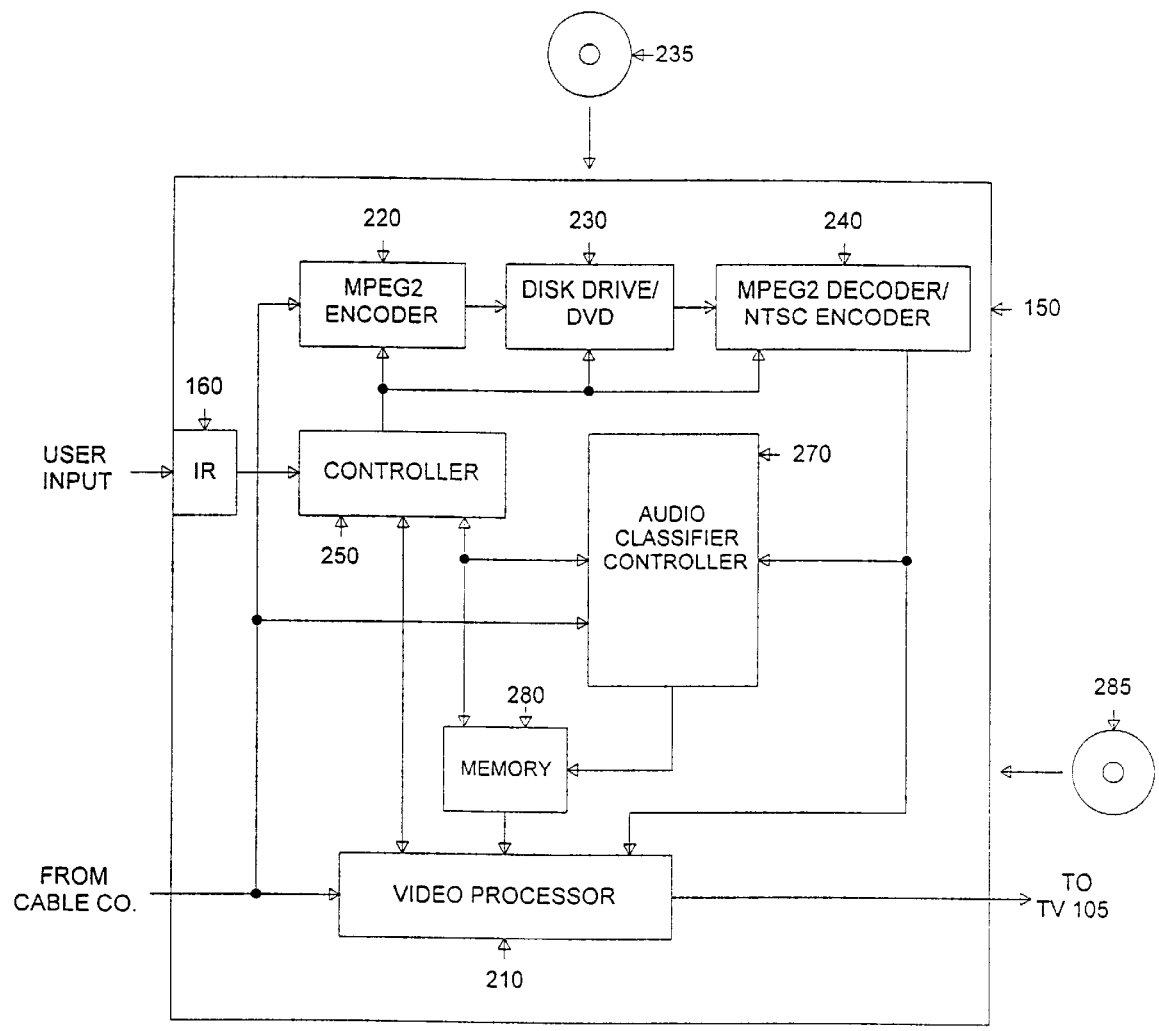
FIG. 2 illustrates a block diagram of the exemplary video recorder, according to an advantageous embodiment of the present invention.

FIG. 2 illustrates exemplary video recorder 150 in greater detail according to one embodiment of the present invention. Video recorder 150 comprises IR sensor 160, video processor 210, MPEG-2 encoder 220, hard disk drive 230, MPEG-2 decoder/NTSC encoder 240, and controller 250. Video recorder 150 further comprises audio classifier controller 270 and memory 280. Controller 250 directs the overall operation of video recorder 150, including View mode, Record mode, Play mode, Fast Forward (FF) mode, Reverse mode, among others.

In View mode, controller 250 causes the incoming television signal from the cable service provider to be demodulated and processed by video processor 210 and transmitted to television set 105, without storing video signals in (or retrieving video signals from) hard disk drive 230. Video processor 210 contains radio frequency (RF) front-end circuitry for receiving incoming television signals from the cable service provider, tuning to a user-selected channel, and converting the selected RF signal to a baseband television signal (e.g., super video signal) suitable for display on television set 105. Video processor 210 also is capable of receiving a conventional NTSC signal from MPEG-2 decoder/NTSC encoder 240 and video frams from memory 280 and transmitting a baseband television signal (e.g., super video signal) to television set 105.

In Record mode, controller 250 causes the incoming television signal to be stored on hard disk drive 230. Under the control of controller 250, MPEG-2 encoder 220 receives an incoming analog television signal from the cable service provider and converts the received RF signal to MPEG format for storage on hard disk drive 230. Note that in the case of a digital television signal, the signal may be stored directly on hard disk drive 230 without being encoded in MPEG-2 encoder 220.

In Play mode, controller 250 directs hard disk drive 230 to stream the stored television signal (i.e., a program) to MPEG-2 decoder/NTSC encoder 240, which converts the MPEG-2 data from hard disk drive 230 to, for example, a super video (S-video) signal that video processor 210 transmits to television set 105.

It should be noted that the choice of the MPEG-2 standard for MPEG-2 encoder 220 and MPEG-2 decoder/NTSC encoder 240 is by way of illustration only. In alternate embodiments of the present invention, the MPEG encoder and decoder may comply with one or more of the MPEG-1, MPEG-2, and MPEG-4 standards, or with one or more other types of standards.

For the purposes of this application and the claims that follow, hard disk drive 230 is defined to include any mass storage device that is both readable and writable, including, but not limited to, conventional magnetic disk drives and optical disk drives for read/write digital versatile disks (DVD–RW standard and DVD+RW standard), re-writable CD-ROMs, VCR tapes and the like. In fact, hard disk drive 230 need not be fixed in the conventional sense that it is permanently embedded in video recorder 150. Rather, hard disk drive 230 includes any mass storage device that is dedicated to video recorder 150 for the purpose of storing recorded video programs. Thus, hard disk drive 230 may include an attached peripheral drive or removable disk drives (whether embedded or attached), such as a juke box device (not shown) that holds several read/write DVDs or re-writable CD-ROMs. As illustrated schematically in FIG. 2, removable disk drives of this type are capable of receiving and reading re-writable CD-ROM disk 235.

Furthermore, in an advantageous embodiment of the present invention, hard disk drive 230 may include external mass storage devices that video recorder 150 may access and control via a network connection (e.g., Internet protocol (IP) connection), including, for example, a disk drive in the viewer's home personal computer (PC) or a disk drive on a server at the viewer's Internet service provider (ISP).

Controller 250 obtains information from video processor 210 concerning video signals that are received by video processor 210. When controller 250 determines that video recorder 150 is receiving a video program, controller 250 determines if the video program is one that has been selected to be recorder. If the video program is to be recorded, then controller 250 causes the video program to be recorded on hard disk drive 230 in the manner previously described. If the video program is not to be recorded, then controller 250 causes the video program to be processed by video processor 210 and transmitted to television set 105 in the manner previously described.

Memory 280 may comprise random access memory (RAM) or a combination of random access memory (RAM) and read only memory (ROM). Memory 280 may comprise a non-volatile random access memory (RAM), such as a flash memory card. In an alternate advantageous embodiment of video recorder 150, memory 280 may comprise a mass storage data device, such as a hard disk drive (not shown). Memory 280 may also include an attached peripheral drive or removable disk drives (whether embedded or attached) that reads read/write DVDs or re-writable CD-ROMs. As illustrated schematically in FIG. 2, removable disk drives of this type are capable of receiving and reading re-writable CD-ROM disk 285.

As the video program is recorded on hard disk drive 230, (or, alternatively, after the video program has been recorded on hard disk drive 230), audio classifier controller 270 extracts an audio signal and separates the extracted audio signal into discrete audio categories, including speech, music, noise, and silence. Audio classifier controller 270 sends the extracted voice signals to speaker identifier 330 (shown in FIG. 3). Speaker identifier 330 analyzes the voice signals to identify the person who is speaking. Audio classifier controller 270 inserts time stamps into the extracted and categorized audio data.

Figure 3:
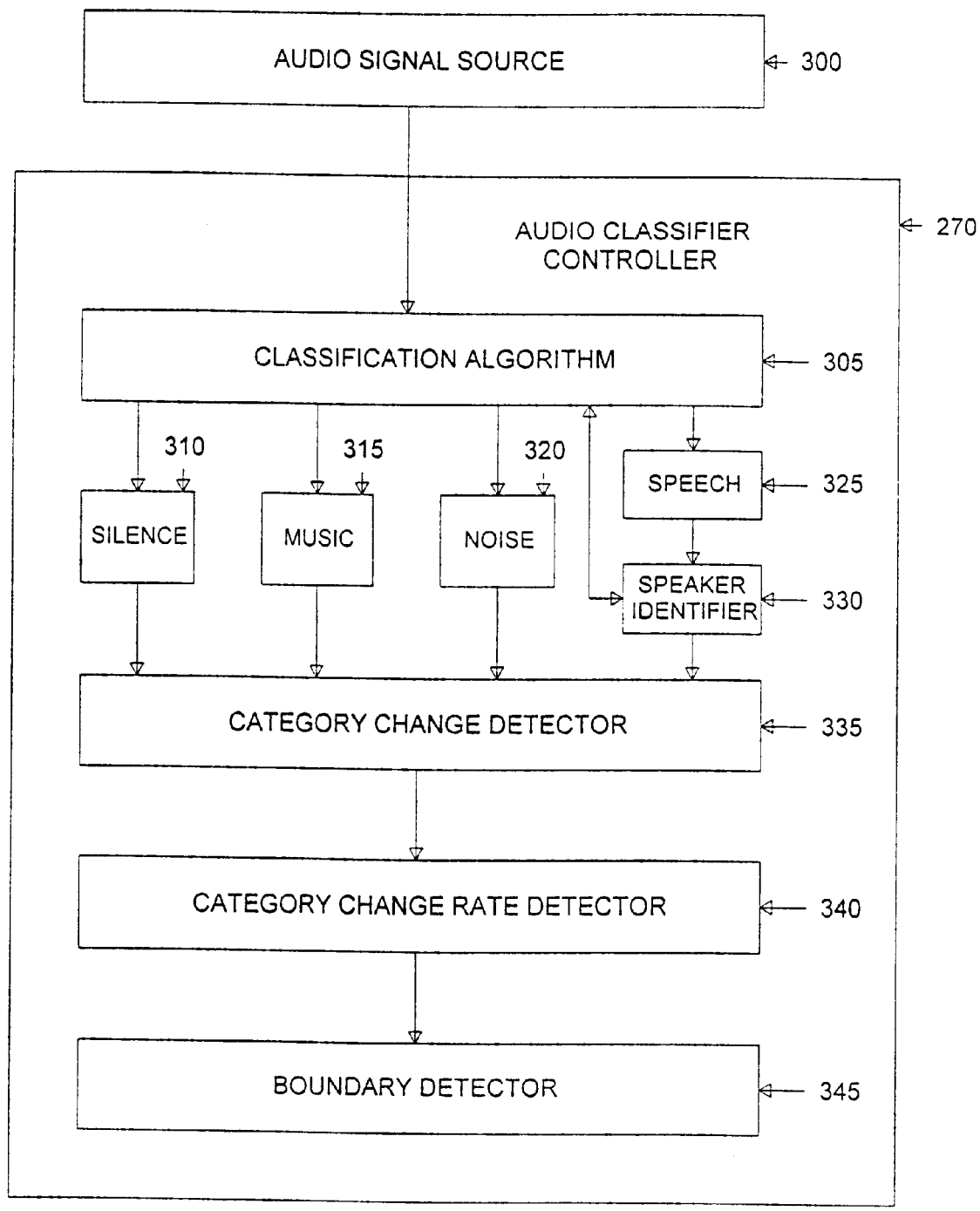
FIG. 3 illustrates a block diagram of an exemplary audio classifier controller, according to an advantageous embodiment of the present invention.

A block diagram of audio classifier controller 270 is shown in detail in FIG. 3. Audio classifier controller 270 executes software instructions to identify and classify audio portions of a video program segment using audio categories. Audio classification may be achieved with multidimensional feature based methods that are known in the art. These methods typically use Linear Predictive Coding (LPC) derived cepstral coefficients and their regression coefficients, energy level, average energy, Zero Crossing Rate (ZCR), etc. For further information refer to a paper entitled "Classification of General Audio Data for Content-Based Retrieval" by Dongge Li, Ishwar K. Sethi, Nevenka Dimitrova and Tom McGee, Technical Report, Oakland University, Rochester Minn., TR-CSE-IIE-00-11, 2000.

The source of audio signals for audio classifier controller 270 is identified in FIG. 3 with the reference numeral 300. Audio classifier controller 270 comprises classification algorithm 305 for classifying audio signals from audio signal source 300, four data buffers, 310 through 325, for recording information for four different types of audio categories, speaker identifier 330 containing a speech database of speaker identification data, category change detector 335, category change rate detector 340, and boundary detector 345.

Audio classifier controller 270 receives audio signal segments directly from audio signal source 300 and classifies the audio signal segments with classification algorithm 305. Classification algorithm 305 classifies the audio signals into individual types of audio categories, such as silence, music, noise, speech and any combination of these audio categories. These four types of audio categories are illustrated in FIG. 3. These types are not the only types of audio categories that may be used. It is clear that other types of audio categories may also be identified and classified (e.g., laughter).

Classification algorithm 305 records information for the audio category of "silence" in data buffer 310, records information for the audio category of "music" in data buffer 315, records information for the audio category of "noise" in data buffer 320, and records information for the audio category of "speech" in data buffer 325. Classification algorithm 305 also inserts time stamps into the categorized audio signals.

Speaker identifier 330 contains a speech database of voice identification information for persons whose voices have been previously identified, classified, and recorded. Classification algorithm 305 is capable of accessing the speech database within speaker identifier 330. When classification algorithm 305 classifies an audio signal as a "speech" audio signal, classification algorithm 305 accesses speaker identifier 330 to identify the speaker. If the speaker can be identified, the identity of the speaker is added to the data concerning the "speech" audio category. Classification algorithm 305 is capable of classifying "speech" audio signals from more than one speaker. A first "speech" audio signal may be identified as originating from a first speaker and a second "speech" audio signal may be identified as originating from a second speaker.

"Speech" audio signals from unidentified speakers are classified in a "unknown speaker" category. Whenever a "speech" audio signal from an unknown speaker is identified, that unknown speaker is added to the speech database and identified as "unknown speaker number 1." When a "speech" audio signal from a second unknown speaker is identified, that second unknown speaker is added to the speech database and identified as "unknown speaker number 2." Each time an unknown speaker is detected, the unknown speaker's "speech" audio signal is compared to the "speech" audio signals of each of the unknown speakers in the speech database to see if the unknown speaker is one that has already been added to the speech database.

Classification algorithm 305 can use this information to determine the number of unknown speakers who speak within a given period of time. The existence of a relatively large number of unknown speakers within a short period of time can indicate the presence of a commercial within the video data stream.

Classification algorithm 305 also updates the speech database in speaker identifier 330 to add voice identification information for new persons who appear in the program portions of the video data stream. These persons may be new actors and actresses, new musicians, newly elected politicians, etc. It is not necessary to update the speech database with voice identification information for new persons who appear in commercials. Therefore, classification algorithm 305 records the number of times that new unknown persons appear and whether they appear in commercials or in the program portions of the video data stream. Classification algorithm 305 then deletes all information relating to new unknown persons who appear in commercials (unless they also happen to appear in the program portion of the video data stream).

After the individual audio signal segments have been categorized in the proper audio categories, classification algorithm 305 sends the classification information to category change detector 335. Category change detector 335 uses time stamp information to detect when a first portion of the audio signal that has been categorized in a first category ceases and when a second portion of the audio signal categorized in a second category begins. Category change detector 335 determines when a category of the audio signal changes and determines the identity of the two categories involved. Specifically, category change detector 335 is capable of determining that an audio signal has changed from a speech signal to a music signal, or that an audio signal has changed from a silent signal to a speech signal, and so on.

Category change detector 335 also detects when a first portion of the audio signal that has been categorized in a first subcategory ceases and when a second portion of the audio signal categorized in a second subcategory begins. For example, category change detector 335 is capable of determining that an audio signal has changed from a first subcategory of speech with background music to a second subcategory of speech with background noise.

Category change detector 335 also determines when a first portion of the audio signal categorized in a first speaker category ceases and when a second portion of the audio signal categorized in a second speaker category begins. Category change detector 335 determines when a speaker category of the audio signal changes. Category change detector 335 is capable of determining that an audio signal has changed from a first speaker to a second speaker, or from a second speaker to a third speaker, and so on.

Category change detector 335 sends this information to category change rate detector 340. Category change rate detector 340 detects the rate at which the various categories are changing. Category change rate detector 340 uses time stamp information to calculate how many times each particular category is changing within a unit time (e.g., one minute).

Category change rate detector 340 determines the rate of change for each of the categories. Category change rate detector 340 uses the rate of change for each of the categories to determine an overall change rate. The overall change rate takes into account 1) the change rate of each category, and 2) the audio cut rate (i.e., the rate at which all of the categories are changing), and 3) the total length of time of each category, and 4) the ratio of the change rate of each category to the total length of time of the category within a given period of time. Category change rate detector 340 then sends the information described above to boundary detector 345.

Boundary detector 345 uses the information (including the overall change rate) to locate the boundaries of video programs and commercials. It is known that commercials often contain diverse and rapidly changing audio categories. Commercials usually have a larger number of speaker changes (within a given time) than do other types of video segments. If boundary detector 345 receives change rate information that shows that the rate of change of speakers is above a preselected threshold value, then boundary detector 345 may infer that a commercial is in progress. An appropriate threshold value may be obtained empirically by measuring the rate of change of speakers for a large number of commercials.

Boundary detector 345 may assign a "weighting factor" to each change in each category. The weighting factor may be a number that represents the relative importance assigned to the category change in assessing the likelihood of locating a boundary at the point where the particular change in category occurs. For example, if it is determined that a change from "silence" to "music" is more likely to be associated with an initial boundary, then the numerical factor that represents that particular category change may be multiplied by a "weighting factor" to increase the relative impact of that particular category change in determining the likelihood of the existence of an initial boundary.

In addition to the method described above, the "weighting factors" can be automatically computed directly from the category change features. In the multidimensional feature space used to describe audio classifier controller 270, each category (e.g., speech, music) has a mean vector that represents the centroid of that category. The distances between each of those mean vectors is also a measure of the significance of a category change. The distance between the means vectors can therefore be used to quantify the importance of a category change.

Boundary detector 345 uses the audio categories (such as speech, silence, music and noise), and the audio subcategories (such as speech with background noise, music with background noise), and the speaker categories (such as identified speakers and unknown speakers). To determine the boundary of a commercial segment, boundary detector 345 selects the size of a time window. For example, for a commercial the size of the time window can be selected to be twenty (20) seconds. Boundary detector 345 performs a sliding window high-level feature extraction and classification process to extract the following high-level features: 1) the rate of change of each category (i.e., how many times each category appears during the time window), 2) the length of each category within the time window (n-values for n categories), 3) the rate change of audio cuts (any category change) computed with the corresponding weighting factors, and 4) the average audio cut distance. These four features are sent to a classifier (not shown) within boundary detector 345 (e.g., a nearest neighbor classifier) that determines whether the audio segment within the time window is or is not a commercial segment. If the classifier is a probabilistic classifier (e.g., a Bayesian classifier), then classifier determines a probability that the audio segment within the time window is or is not a commercial segment.

To determine the boundary of a program segment, boundary detector 345 selects the size of a time window. For example, for a program segment the size of the time window can be selected to be five (5) minutes.

Boundary detector 345 then performs a sliding window high-level feature extraction and classification process to extract the following high-level features: 1) the rate of change of each category (i.e., how many times each category appears during the time window), 2) the length of each category within the time window (adjusted by the weighting factor), 3) the rate change of audio cuts (any category change), and 4) the average audio cut distance. These four features are sent to a probabilistic classifier (not shown) within boundary detector 345 (e.g., a Bayesian classifier) that determines the probability that the audio segment within the time window belongs to a particular class. For example, the audio segment may belong to a dialog, or to a news story, or to a music video, or to a crowd scene with shouting, etc. The output values from the sliding window are subjected to an analysis for a global minimum among the different segments and to an overall analysis (e.g., for the last one hour of time).

The result is then analyzed with the help of heuristics concerning program boundaries. Examples of heuristics concerning program boundaries include 1) a musical audio logo is usually present at the start of a news program, 2) there is usually a commercial close to end of every program, 3) credits at the end of a movie are usually shown with music in the background, and 4) the identity of the speaker (or speakers) almost always changes between programs.

Figure 4:
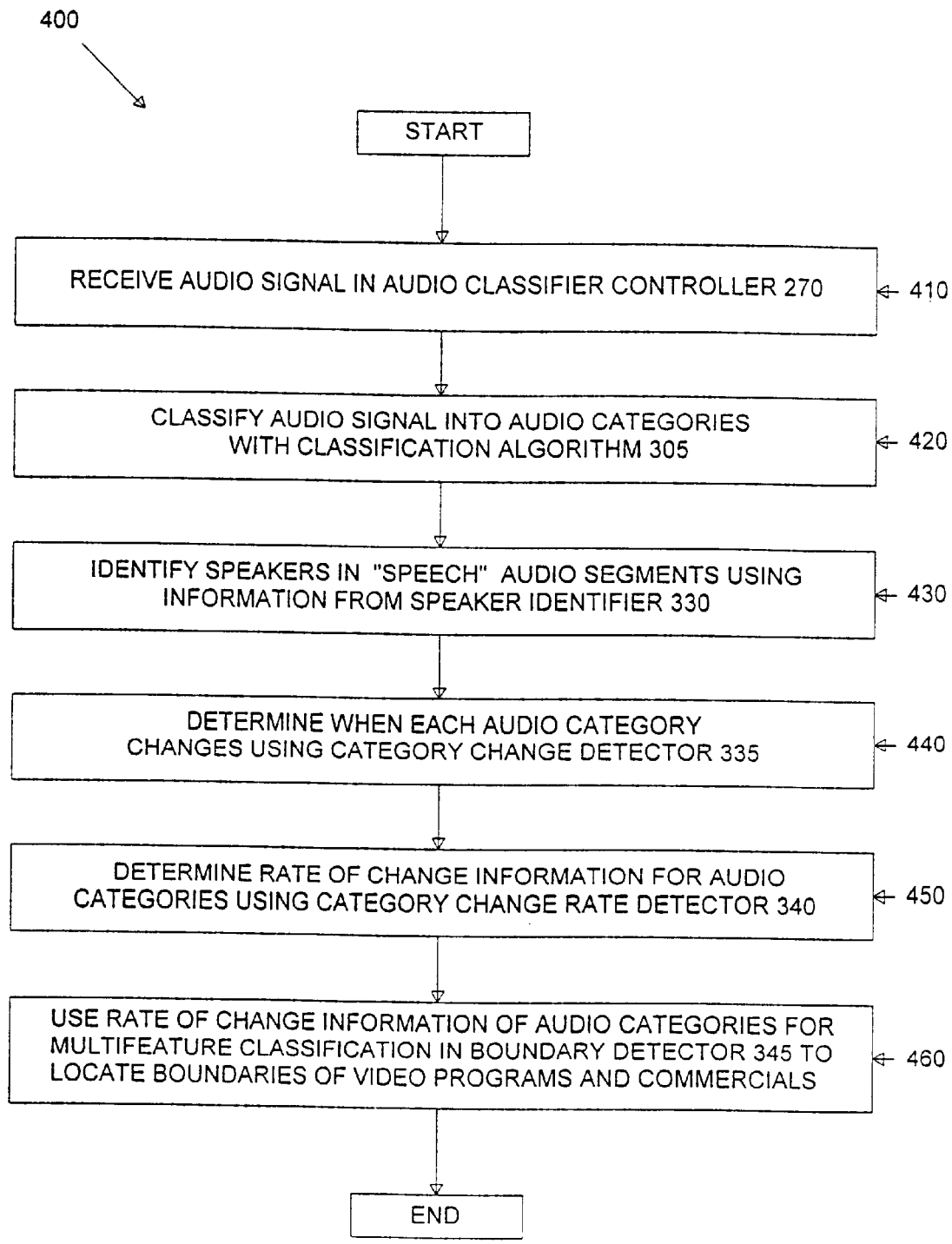
FIG. 4 illustrates a flow chart depicting the operation of an exemplary audio classifier controller, according to an advantageous embodiment of the present invention.

FIG. 4 illustrates flow chart 400 depicting the operation of audio classifier controller 270, according to an advantageous embodiment of the present invention. Flow chart 400 depicts one advantageous method of operation of the present invention in audio classifier controller 270 in video recorder 150. Audio classifier controller 280 receives an audio signal from an audio signal source 300 (step 410). Audio classifier controller 270 classifies the audio signal into audio categories (and subcategories) using classification algorithm 305 (step 420). Classification algorithm 305 identifies individual speakers in each segment in the "speech" audio category using information from speaker identifier 330 (step 430). Category change detector 335 then determines when each audio category (or subcategory) changes (step 440). Category change rate detector 340 then determines the rate of change of audio categories (or subcategories) (step 450). Boundary detector 345 then uses the rate of change information of audio categories (or subcategories) for multifeature classification to locate boundaries of video programs and commercials (step 460).

The present invention has been described as a system and method for locating boundaries of video programs and commercials in a video signal processor. The system and method of the present invention may also be used in an audio processor. An audio processor receives and processes only an audio signal. An audio processor may comprise, for example, a radio receiver, an audio recorder, a device for receiving streaming audio data signals (from a source such as the Internet), or a computerized personal audio multimedia retrieval system.

Although the present invention has been described in detail, those skilled in the art should understand that they can make various changes, substitutions and alterations herein without departing from the spirit and scope of the invention in its broadest form.

What is claimed is:

1. A system, for use in a video signal processor, for locating boundaries of video programs and commercials, said system comprising:

an audio classifier controller for receiving at least one audio category of at least one segment of an audio signal, for determining at least one rate of change of said at least one audio category, and for locating at least one of said boundaries by comparing said at least one rate of change of said at least one audio category with a threshold value, wherein said audio classifier controller comprises a classification algorithm for classifying audio signals to obtain at least one audio category for each segment of said audio signal, and wherein said classification algorithm classifies audio signals into audio categories of silence, music, noise and speech.

2. The system as claimed in claim 1, wherein said audio classifier controller comprises a speaker identifier comprising a speech database containing voice identification information of persons whose voices have been identified, and wherein said classification algorithm accesses said speech database of said speaker identifier and classifies speech audio signals of persons whose voices are in said speech database of said speaker identifier as audio categories.

3. The system as claimed in claim 2, wherein said speaker identifier comprises an unknown speaker database containing voice information of persons whose voices have not been identified, wherein said classification algorithm accesses said unknown speaker database and determines the number of unknown speakers who speak within a given period of time, and wherein said classification algorithm updates said speech database in said speaker identifier to add voice identification information for newly identified speakers.

4. A system, for use in a video signal processor, for locating boundaries of video programs and commercials comprising:

an audio classifier controller for receiving at least one audio category of at least one segment of an audio signal, for determining at least one rate of change of said at least one audio category, and for locating at least one of said boundaries by comparing said at least one rate of change of said at least one audio category with a threshold value, wherein said audio classifier controller comprises a category change detector for receiving audio categories of segments of said audio signal, for determining when an audio category of said audio signal changes, and for determining the identities of said audio categories before and after said change of audio category, and wherein said category change detector detects audio subcategories of segments of said audio signal, determines when an audio subcategory of said audio signal changes, and determines the identities of said audio subcategories before and after said change of audio subcategory, wherein said audio classifier controller comprises a category change rate detector for receiving information from said category change detector concerning audio category changes, and for calculating the rates at which said audio category changes occur, and wherein said category change rate detector determines an overall change rate using information from the change rate of each category, the audio cut rate, the total length of time of each category, and the ratio of the change rate of each category to the total length of time of the category within a given period of time.

5. The system as claimed in claim 4, wherein said audio classifier controller comprises a boundary detector for receiving information from said category change rate detector concerning audio category rate changes, and for comparing a value of at least one audio category rate change with a threshold value to locate at least one boundary of a video program segment.

6. The system as claimed in claim 5, wherein said boundary detector assigns a weighting factor to each change in each category, said weighting factor comprising a number representing the relative importance assigned to the category change in assessing the likelihood of locating a boundary at a point where a particular change in category occurs.

7. The system as claimed in claim 5, wherein said boundary detector receives information from said category change rate detector concerning an overall change rate determined by using information from the change rate of each category, the audio cut rate, the total length of time of each category, and the ratio of the change rate of each category to the total length of time of the category within a given period of time, said boundary detector comparing a value of at least one overall change rate with a threshold value to locate at least one boundary of a video program segment.

8. A method of locating boundaries of video programs and commercials comprising the steps of:
  receiving at least one audio category of at least one segment of an audio signal in an audio classifier controller;
  determining at least one rate of change of said at least one audio category;
  locating at least one of said boundaries by comparing said at least one rate of change of said at least one audio category with a threshold value;
  classifying audio signals with a classification algorithm of said audio classifier controller to obtain at least one audio category for each segment of said audio signal; and
  classifying audio signals into audio categories of silence, music, noise and speech with said classification algorithm.

9. The method as claimed in claim 8, wherein said method further comprises the steps of:

accessing a speech database in a speaker identifier within said audio classifier controller that contains voice identification information of persons who have been identified; and
  classifying speech audio signals of persons whose voices are in said speech database as audio categories.

10. The method as claimed in claim 9, wherein said method further comprises the steps of:
  accessing a unknown speaker database in said speaker identifier that contains voice information of persons who have not been identified;
  determining the number of unknown speakers who speak within a given period of time; and
  updating said speech database in said speaker identifier to add voice identification information for newly identified speakers.

11. A method of locating boundaries of video programs and commercials comprising the steps of:
  receiving at least one audio category of at least one segment of an audio signal in an audio classifier controller;
  determining at least one rate of change of said at least one audio category; and
  locating at least one of said boundaries by comparing said at least one rate of change of said at least one audio category with a threshold value;
  receiving audio categories of said audio signal in a category change detector of said audio classifier controller;
  determining, in said category change detector, when an audio category of said audio signal changes;
  determining, in said category change detector, the identities of said audio categories before and after said change of audio category;
  receiving audio subcategories of said audio signal in a category change detector of said audio classifier controller;
  determining in said category change detector when an audio subcategory of said audio signal changes; and
  determining, in said category change detector, the identities of said audio subcategories before and after said change of audio subcategory.

12. A method of locating boundaries of video programs and commercials comprising the steps of:
  receiving at least one audio category of at least one segment of an audio signal in an audio classifier controller;
  determining at least one rate of change of said at least one audio category; and
  locating at least one of said boundaries by comparing said at least one rate of change of said at least one audio category with a threshold value;
  receiving audio categories of said audio signal in a category change detector of said audio classifier controller;
  determining, in said category change detector, when an audio category of said audio signal changes;
  determining, in said category change detector, the identities of said audio categories before and after said change of audio category;
  determining, in said category change rate detector, an overall change rate using information from the change rate of each category, the audio cut rate, the total length of time of each category, and the ratio of the change rate of each category to the total length of time of the category within a given period of time; and comparing a value of at least one overall change rate with a threshold value to locate at least one boundary of a video segment.

13. The method as claimed in claim 12, wherein said method further comprises the steps of:

receiving information in a boundary detector of said audio classifier controller from said category change rate detector concerning audio category rate changes; and comparing at least one audio category rate change with a threshold value to locate at least one boundary of a video program segment containing said audio signal.

14. The method as claimed in claim 13, wherein the method further comprises the step of:

assigning a weighting factor to each change in each category, wherein said weighting factor comprises a number representing the relative importance assigned to the category change in assessing the likelihood of locating a boundary at a point where a particular change in category occurs.

\* \* \* \* \*